(12) United States Patent
Zylinski et al.

(10) Patent No.: US 12,281,682 B2
(45) Date of Patent: Apr. 22, 2025

(54) DUAL RATE JOUNCE BUMPER AND A VEHICLE COMPRISING THE SAME

(71) Applicant: BASF SE, Ludwigshafen am Rhein (DE)

(72) Inventors: Tomasz Zylinski, Wyandotte, MI (US); Timothy J Smith, Wyandotte, MI (US)

(73) Assignee: BASF SE, Ludwigshafen am Rhein (DE)

( * ) Notice: Subject to any disclaimer, the term of this patent is extended or adjusted under 35 U.S.C. 154(b) by 361 days.

(21) Appl. No.: 17/754,086

(22) PCT Filed: Sep. 24, 2020

(86) PCT No.: PCT/EP2020/076650
§ 371 (c)(1),
(2) Date: Mar. 23, 2022

(87) PCT Pub. No.: WO2021/058614
PCT Pub. Date: Apr. 1, 2021

(65) Prior Publication Data
US 2022/0364622 A1    Nov. 17, 2022

Related U.S. Application Data

(60) Provisional application No. 62/906,173, filed on Sep. 26, 2019.

(30) Foreign Application Priority Data

Nov. 12, 2019   (EP) .................................... 19208622

(51) Int. Cl.
*F16F 9/58*    (2006.01)
*B60G 11/54*   (2006.01)
*F16F 1/371*   (2006.01)

(52) U.S. Cl.
CPC ............ *F16F 1/3713* (2013.01); *B60G 11/54* (2013.01); *F16F 9/58* (2013.01);
(Continued)

(58) Field of Classification Search
CPC ...... F16F 1/3713; F16F 9/58; F16F 2224/025; F16F 2224/0208; F16F 2234/02;
(Continued)

(56) References Cited

U.S. PATENT DOCUMENTS 4,810,003 A * 3/1989 Pinch ................... B60G 13/006
267/33
4,962,916 A * 10/1990 Palinkas ................. F16F 1/373
267/293

(Continued)

FOREIGN PATENT DOCUMENTS

CN      106402223 A     2/2017
DE      2624527  A1    12/1977
(Continued)

OTHER PUBLICATIONS

European Search Report for EP Patent Application No. 19208622.1, Issued on Apr. 14, 2020, 3 pages.
(Continued)

*Primary Examiner* — Christopher P Schwartz
(74) *Attorney, Agent, or Firm* — Baltazar Gomez

(57) ABSTRACT

A dual rate jounce bumper and a vehicle containing the dual rate jounce bumper are useful.

19 Claims, 4 Drawing Sheets

(52) U.S. Cl.
CPC .. *B60G 2202/312* (2013.01); *B60G 2204/125* (2013.01); *B60G 2204/4502* (2013.01); *B60G 2206/7104* (2013.01); *B60G 2206/72* (2013.01); *F16F 2224/0208* (2013.01); *F16F 2224/025* (2013.01); *F16F 2234/02* (2013.01)

(58) Field of Classification Search
CPC .............. B60G 11/54; B60G 2202/312; B60G 2204/125; B60G 2204/4502; B60G 2206/72; B60G 2206/7104
USPC ......................... 188/322.12, 321.11; 267/220
See application file for complete search history.

(56) References Cited

U.S. PATENT DOCUMENTS

| | | | |
|---|---|---|---|
| 9,545,829 B2 * | 1/2017 | Al-Dahhan | ............ B60G 11/22 |
| 2010/0025903 A1 * | 2/2010 | Thye-Moormann | ........................ F16F 1/3732 267/153 |
| 2010/0213656 A1 | 8/2010 | Patil et al. | |
| 2015/0239315 A1 * | 8/2015 | Al-Dahhan | ............. F16F 3/093 267/293 |
| 2019/0106526 A1 * | 4/2019 | Makihara | ............... C08G 18/10 |
| 2019/0136929 A1 * | 5/2019 | Thye-Moormann | ... B60G 11/22 |

FOREIGN PATENT DOCUMENTS

| | | |
|---|---|---|
| DE | 2624528 A1 | 12/1977 |
| DE | 10124924 A1 | 11/2002 |
| WO | WO-2017/202620 A1 | 11/2017 |

OTHER PUBLICATIONS

International Search Report for PCT Patent Application No. PCT/EP2020/076650, Issued on Oct. 14. 2020, 3 pages.
International Preliminary Report on Patentability for PCT Patent Application No. PCT/EP2020/076650, issued on Mar. 15, 2022, 8 pages.
Written Opinion for PCT Patent Application No. PCT/EP2020/076650, Issued on Oct. 14, 2020, 6 pages.

* cited by examiner

DUAL RATE JOUNCE BUMPER AND A VEHICLE COMPRISING THE SAME

CROSS-REFERENCE TO RELATED APPLICATIONS

This application is the National Stage entry under § 371 of International Application No. PCT/EP2020/076650, filed on Sep. 24, 2020, and which claims the benefit of priority to European Application No. 19208622.1, filed on Nov. 12, 2019; and priority to U.S. Provisional Application No. 62/906,173, filed on Sep. 26, 2019. The content of each of these applications is hereby incorporated by reference in its entirety.

BACKGROUND OF THE INVENTION

Field of Invention

The present invention relates to a dual rate jounce bumper and a vehicle comprising the same.

Description of Related Art

Jounce bumpers are used in a suspension system of a vehicle to limit transmission of an impact force to a frame member of the vehicle. For example, when the vehicle travels over a bump, components of the suspension system, such as a strut assembly, jounce or collapse to absorb the energy generated by the impact. However, when the suspension system cannot completely dissipate the energy, the components of the suspension system can impact the frame assembly, thereby, transmitting the impact force to the frame member, which is not desirable.

Generally, the jounce bumpers gradually stiffen the suspension systems as the suspension system approaches an end of its jounce travel, i.e. before the components of the suspension system impact the frame of the vehicle. As such, a conventional jounce bumper is used to separate components of the suspension system and the frame member of the vehicle to prevent the suspension system from directly impacting the frame member. For example, the conventional jounce bumper may be coupled to a piston rod of a strut assembly and the frame of the vehicle. The conventional jounce bumper separates the cylinder of the strut assembly and the frame member of the vehicle to prevent the cylinder from directly impacting the frame member as the strut assembly approaches the end of its jounce travel.

U.S. Pat. No. 9,545,829 B2 discloses a dual rate jounce bumper comprising a bumper and an outer member. The outer member is disposed about the bumper and is capable of limiting the radial expansion of the bumper as the bumper is compressed for increasing a stiffness of the bumper. The outer member is also radially expandable as the bumper is compressed.

WO 2017/202620 A1 describes smoothing the rigidity profile when compression of the spring element commences. The supporting ring described here increases the rigidity of the spring element when compression increases and for ensuring a highly progressive compression behaviour. For this, the supporting ring is made of elastomers having Shore A hardness of 45 or higher, in particular of 75±5.

Another US 2010/0213656 A1 describes a jounce-bumper assembly for a vehicular suspension system comprising jounce bumper coupled to a second bumper, and a striker cap having a first end comprising a first cylindrical inner surface circumferentially coupled over a first cylindrical outer surface and having a second end configured for resilient engagement with the jounce bumper. The striker cap described is a load management cap to deflect and absorb energy, i.e. to increase the deformation of the jounce-bumper.

The existing suspension systems, particularly the jounce bumpers, despite offering various alternatives for minimizing noise, vibration and harshness (NVH) in the vehicle, have several limitations. One such limitation is minimization or prevention of jounce travel to the vehicle body, particularly a vehicle body bearing heavy load. The existing jounce bumpers can be used in vehicles bearing load up to 70 kN only and result in suspension overtravel upon exceeding the said load. Additionally, inappropriate selection of materials for making the jounce bumper might result in their breakage at higher loads, a considerable increase in their weight and the overall cost.

SUMMARY OF THE INVENTION

It was, therefore, an object of the presently described invention to provide a dual-rate jounce bumper for limiting the jounce travel in the vehicle body, said jounce bumper being capable of bearing loads up to 150 kN, minimizing NVH, preventing suspension overtravel, light in weight and cost effective.

Surprisingly, it has been found that the above object is met by providing a dual-rate jounce bumper (20) comprising a bumper (40) and an outer member (50), wherein said outer member (50) is obtained by overmolding stainless steel with a thermoplastic polyurethane having a shore hardness ranging from a Shore D hardness of 50 to a Shore D hardness of 80 determined according to ASTM D2240-15e1.

Accordingly, in one aspect, the presently described invention is directed to a dual-rate jounce bumper (20) for limiting a jounce travel between a first component (22) and a second component (24) of a vehicle (26) with the second component (24) spaced from and moveable towards the first component (22) along a jounce axis, said jounce bumper (20) comprising:

a bumper (40) having a first end (42) for coupling to the first component (22) and a second end (44) spaced from said first end (42) for contacting the second component (24) with said bumper (40) compressible between the first and the second components (22, 24) for limiting jounce with said bumper (40) radially expandable as said bumper (40) is compressed, and an outer member (50) disposed about said bumper (40) and capable of limiting the radial expansion of said bumper (40) as said bumper (40) is compressed for increasing a stiffness of the bumper (40), wherein said outer member (50) is obtained by overmolding stainless steel with a thermoplastic polyurethane having a shore hardness ranging from a Shore D hardness of 50 to a Shore D hardness of 80 determined according to ASTM D2240-15e1.

In another aspect, the presently described invention is directed to a vehicle (26) comprising a frame member (30) having the first component (22), a suspension having the second component (24), and the above dual-rate jounce bumper (20).

In yet another aspect, the presently described invention is directed to a ring obtained by overmolding stainless steel with a thermoplastic polyurethane having a shore hardness ranging from a Shore D hardness of 50 to a Shore D hardness of 80 determined according to ASTM D2240-15e1, said ring comprising an upper surface, a lower surface, a first wall and a second wall with said upper surface and said lower surface being inclined towards each other, wherein each of the upper surface and the lower surface is an arcuate surface.

DETAILED DESCRIPTION OF THE INVENTION

Figure 1:
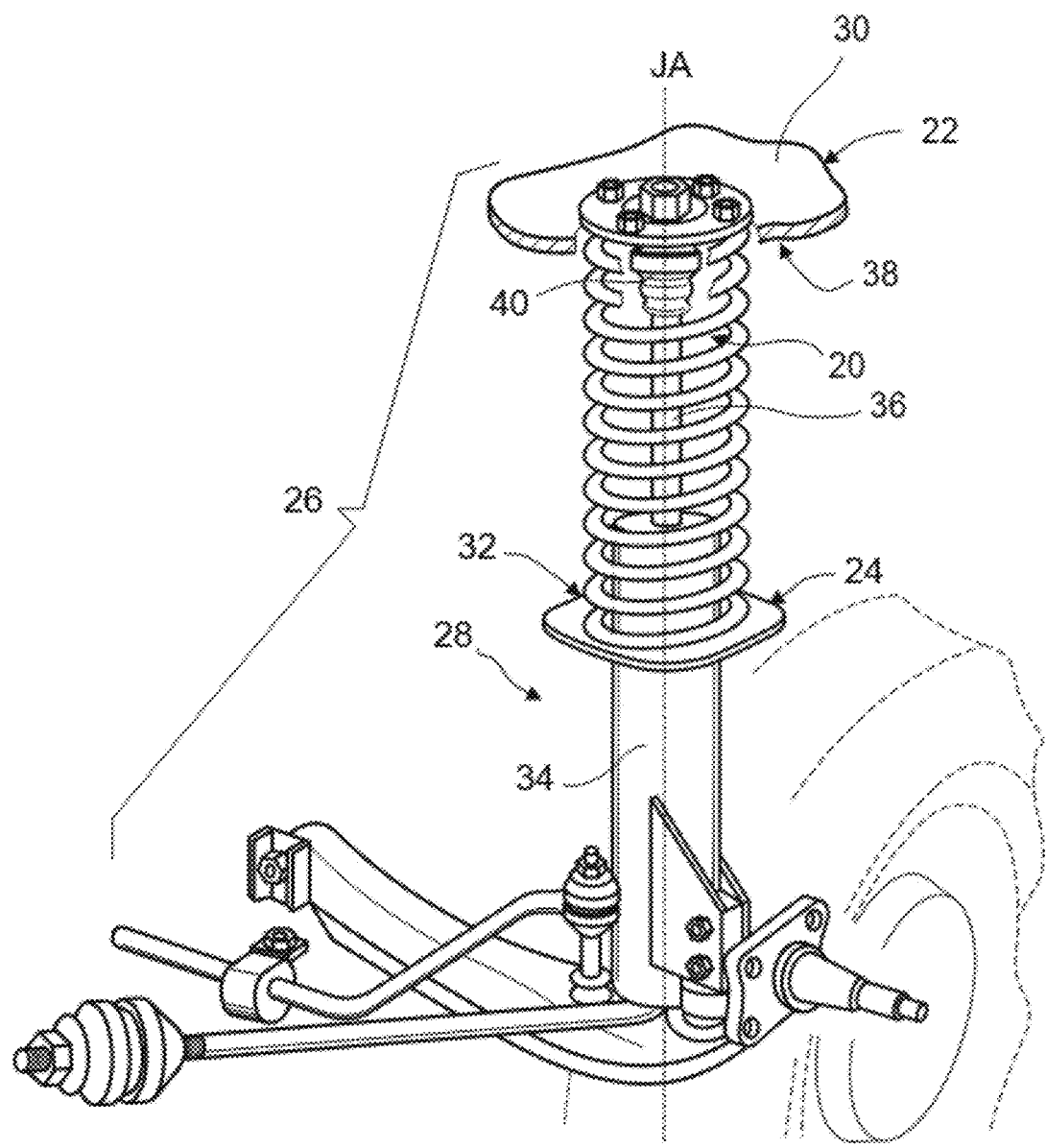
FIG. 1 is a perspective view of a suspension system (28) of a vehicle (26) including a dual-rate jounce bumper (20).

Before the present compositions and formulations of the invention are described, it is to be understood that this invention is not limited to particular compositions and formulations described, since such compositions and formulation may, of course, vary. It is also to be understood that the terminology used herein is not intended to be limiting.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

Furthermore, the terms "first", "second", "third" or "(a)", "(b)", "(c)", "(d)" etc. and the like in the description, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. In case the terms "first", "second", "third" or "(A)", "(B)" and "(C)" or "(a)", "(b)", "(c)", "(d)", "i", "ii" etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the invention, and form different embodiments, as would be understood by those in the art.

Furthermore, the ranges defined throughout the specification include the end values as well, i.e. a range of 1 to 10 implies that both 1 and 10 are included in the range. For the avoidance of doubt, the applicant shall be entitled to any equivalents according to applicable law.

An aspect of the present invention is embodiment 1, directed to a dual-rate jounce bumper (20) for limiting a jounce travel between a first component (22) and a second component (24) of a vehicle (26) with the second component (24) spaced from and moveable towards the first component (22) along a jounce axis, said jounce bumper (20) comprising:
  a bumper (40) having a first end (42) for coupling to the first component (22) and a second end (44) spaced from said first end (42) for contacting the second component (24) with said bumper (40) compressible between the first and the second components (22, 24) for limiting jounce with said bumper (40) radially expandable as said bumper (40) is compressed, and
  an outer member (50) disposed about said bumper (40) and capable of limiting the radial expansion of said bumper (40) as said bumper (40) is compressed for increasing a stiffness of the bumper (40),
  wherein said outer member (50) is obtained by overmolding stainless steel with a thermoplastic polyurethane having a shore hardness ranging from a Shore D hardness of 50 to a Shore D hardness of 80 determined according to ASTM D2240-15e1.

Thermoplastic Polyurethane (TPU)

In one embodiment, the TPU in the embodiment 1 has the shore hardness ranging from Shore D hardness of 60 to Shore D hardness of 80, or Shore D hardness of 70 to Shore D hardness of 80.

In another embodiment, the TPU in the embodiment 1 is obtained by reacting:
  (a) a polyol,
  (b) an isocyanate, and
  (c) optionally a chain extender.

Suitable polyols have an average functionality in between 1.9 to 8.0, or in between 1.9 to 6.0, or in between 1.9 to 4.0 and a hydroxyl number in between 10 mg KOH/g to 1800 mg KOH/g, or in between 10 mg KOH/g to 1500 mg KOH/g, or even between 10 mg KOH/g to 1000 mg KOH/g. The polyols can be present in an amount in between 1 wt.-% to 99 wt.-%, based on the total weight of the TPU.

In one embodiment, the polyol is selected from polyether polyols, polyester polyols, polyether-ester polyols and a mixture thereof.

Polyether polyols, according to the invention, have an average functionality in between 1.9 to 8.0, or in between 1.9 to 6.0, or in between 1.9 to 4.0, or in between 1.9 to 3.0, or even in between 1.9 to 2.1 and a hydroxyl number in between 10 mg KOH/g to 1800 mg KOH/g, or in between 10 mg KOH/g to 1500 mg KOH/g, or in between 10 mg KOH/g to 1000 mg KOH/g, or even between 10 mg KOH/g to 500 mg KOH/g.

In one embodiment, the TPU in the embodiment 1 is obtained by reacting:
(a) the polyol having an average functionality in between 1.9 to 2.1 and a hydroxyl number in between 10 mg KOH/g to 500 mg KOH/g,
(b) the isocyanate, and
(c) optionally the chain extender.

In another embodiment, the TPU in the embodiment 1 is obtained by reacting:
(a) the polyol having an average functionality in between 1.9 to 2.1 and a hydroxyl number in between 10 mg KOH/g to 500 mg KOH/g,
(b) the isocyanate, and
(c) optionally the chain extender,
wherein the polyol is selected from polyether polyol, polyester polyol, polyether-ester polyol and mixture thereof.

In yet another embodiment, the TPU in the embodiment 1 is obtained by reacting:
(a) the polyether polyol,
(b) the isocyanate, and
(c) optionally the chain extender.

In yet another embodiment, the TPU in the embodiment 1 is obtained by reacting:
(a) the polyether polyol having an average functionality in between 1.9 to 2.1 and a hydroxyl number in between 10 mg KOH/g to 500 mg KOH/g,
(b) the isocyanate, and
(c) optionally the chain extender.

Suitable polyether polyols are obtainable by known methods, for example by anionic polymerization with alkali metal hydroxides, e.g., sodium hydroxide or potassium hydroxide, or alkali metal alkoxides, e.g., sodium methoxide, sodium ethoxide, potassium ethoxide or potassium isopropoxide, as catalysts and by adding at least one amine-containing starter molecule, or by cationic polymerization with Lewis acids, such as antimony pentachloride, boron fluoride etherate and so on, or fuller's earth, as catalysts from one or more alkylene oxides having 2 to 4 carbon atoms in the alkylene moiety.

Starter molecules are generally selected such that their average functionality is in between 2.0 to 8.0, or in between 3.0 to 8.0. Optionally, a mixture of suitable starter molecules is used.

Starter molecules for polyether polyols include amine containing and hydroxyl-containing starter molecules. Suitable amine containing starter molecules include, for example, aliphatic and aromatic diamines such as ethylenediamine, propylenediamine, butylenediamine, hexamethylenediamine, phenylenediamines, toluenediamine, diaminodiphenylmethane and isomers thereof.

Other suitable starter molecules further include alkanolamines, e.g. ethanolamine, N-methylethanolamine and N-ethylethanolamine, dialkanolamines, e.g., diethanolamine, N-methyldiethanolamine and N-ethyldiethanolamine, and trialkanolamines, e.g., triethanolamine, and ammonia.

In one embodiment, amine containing starter molecules are selected from ethylenediamine, phenylenediamines, toluenediamine and isomers thereof. In other embodiment, the amine containing starter molecules comprise ethylenediamine.

Hydroxyl-containing starter molecules are selected from sugars, sugar alcohols, for e.g. glucose, mannitol, sucrose, pentaerythritol, sorbitol; polyhydric phenols, resols, e.g., oligomeric condensation products formed from phenol and formaldehyde, trimethylolpropane, glycerol, glycols such as ethylene glycol, propylene glycol and their condensation products such as polyethylene glycols and polypropylene glycols, e.g., diethylene glycol, triethylene glycol, dipropylene glycol, and water or a combination thereof.

In one embodiment, the hydroxyl-containing starter molecules comprise sugar and sugar alcohols such as sucrose, sorbitol, glycerol, pentaerythritol, trimethylolpropane and mixtures thereof. In other embodiment, the hydroxyl-containing starter molecules comprise sucrose, glycerol, pentaerythritol and trimethylolpropane.

Suitable alkylene oxides having 2 to 4 carbon atoms are, for example, ethylene oxide, propylene oxide, tetrahydrofuran, 1,2-butylene oxide, 2,3-butylene oxide and styrene oxide. Alkylene oxides can be used singly, alternatingly in succession or as mixtures. In one embodiment, the alkylene oxides are propylene oxide and/or ethylene oxide. In other embodiment, the alkylene oxides are mixtures of ethylene oxide and propylene oxide that comprise more than 50 wt.-% of propylene oxide.

In one embodiment, suitable polyether polyols are derived from tetrahydrofuran. Tetrahydrofuran is a cyclic ether and is converted into a linear polymer called poly(tetramethylene ether)glycol (PTMEG) before obtaining the TPU. Commercially available polytetrahydrofuran, under the tradename PolyTHF® from BASF, can also be used.

Accordingly, in an embodiment, the TPU in the embodiment 1 is obtained by reacting:
(a) polytetrahydrofuran having a hydroxyl number in between 10 mg KOH/g to 500 mg KOH/g,
(b) the isocyanate, and
(c) optionally the chain extender.

In one embodiment, the polytetrahydrofuran has a hydroxyl number in between 10 mg KOH/g to 400 mg KOH/g, or 30 mg KOH/g to 300 mg KOH/g, or 30 mg KOH/g to 200 mg KOH/g. In another embodiment, it is in between 50 mg KOH/g to 200 mg KOH/g, or 50 mg KOH/g to 150 mg KOH/g, 80 mg KOH/g to 150 mg KOH/g, or 80 mg KOH/g to 130 mg KOH/g, or 90 mg KOH/g to 130 mg KOH/g.

Suitable amounts of the polyether polyols are in between 1 wt.-% to 99 wt.-%, based on the total weight of the TPU.

Suitable polyester polyols have an average functionality in between 1.9 to 6.0, or between 1.9 to 5.0, or between 1.9 to 4.0, and a hydroxyl number in between 10 mg KOH/g to 500 mg KOH/g.

Polyester polyols, according to the present invention, are based on the reaction product of carboxylic acids or anhydrides with hydroxyl group containing compounds. Suitable carboxylic acids or anhydrides have from 2 to 20 carbon atoms, or from 4 to 18 carbon atoms, for example succinic acid, glutaric acid, adipic acid, suberic acid, azelaic acid, sebacic acid, decanedicarboxylic acid, maleic acid, fumaric acid, phthalic acid, isophthalic acid, terephthalic acid, oleic acid, phthalic anhydride. Particularly comprising phthalic acid, isophthalic acid, terephthalic acid, oleic acid and phthalic anhydride or a combination thereof.

Suitable hydroxyl containing compounds are selected from ethanol, ethylene glycol, propylene-1,2-glycol, propylene-1,3-glycol, butyl-ene-1,4-glycol, butylene-2,3-glycol, hexane-1,6-diol, octane-1,8-diol, neopentyl glycol, cyclohexane dimethanol (1,4-bis-hydroxy-methylcyclohexane), 2-methyl-propane-1,3-diol, glycerol, trimethylolpropane, hexane-1,2,6-triol, butane 1,2,4-triol, trimethylolethane, pentaerythritol, quinitol, mannitol, sorbitol, methyl glycoside, diethylene glycol, triethylene glycol, tetraethylene glycol, polyethylene glycol, dipropylene glycol, polypropylene glycol, polyethylene-propylene glycol, dibutylene glycol and polybutylene glycol. In one embodiment, the hydroxyl containing compounds are selected from ethylene glycol, propylene-1,2-glycol, propylene-1,3-glycol, butyl-ene-1,4-glycol, butylene-2,3-glycol, hexane-1,6-diol, octane-1,8-diol, neopentyl glycol, cyclohexane dimethanol (1,4-bis-hydroxy-methylcyclohexane), 2-methyl-propane-1,3-diol, glycerol, trimethylolpropane, hexane-1,2,6-triol, butane-1,2,4-triol, trimethylolethane, pentaerythritol, quinitol, mannitol, sorbitol, methyl glycoside and diethylene glycol. In some embodiments, the hydroxyl containing compounds are selected from ethylene glycol, propylene-1,2-glycol, propylene-1,3-glycol, butyl-ene-1,4-glycol, butylene-2,3-glycol, hexane-1,6-diol, octane-1,8-diol, neopentyl glycol and diethylene glycol. In other embodiments, the hydroxyl containing compounds are selected from hexane-1,6-diol, neopentyl glycol, diethylene glycol.

Suitable polyether-ester polyols have a hydroxyl number in between 10 mg KOH/g to 500 mg KOH/g and an average functionality in between 1.9 to 5.0.

Such polyether-ester polyols are obtainable as a reaction product of i) at least one hydroxyl-containing starter molecule; ii) of one or more fatty acids, fatty acid monoesters or mixtures thereof; iii) of one or more alkylene oxides having 2 to 4 carbon atoms.

The starter molecules of component i) are generally selected such that the average functionality of component i) is in between 1.9 to 5.0. Optionally, a mixture of suitable starter molecules can be used.

In one embodiment, the hydroxyl-containing starter molecules of component i) are selected from sugars, sugar alcohols (glucose, mannitol, sucrose, pentaerythritol, sorbitol), polyhydric phenols, resols, e.g., oligomeric condensation products formed from phenol and formaldehyde, trimethylolpropane, glycerol, glycols such as ethylene glycol, propylene glycol and their condensation products such as polyethylene glycols and polypropylene glycols, e.g., diethylene glycol, triethylene glycol, dipropylene glycol, water and a mixture thereof.

In other embodiment, the hydroxyl-containing starter molecules of component i) are selected from sugars and sugar alcohols such as sucrose and sorbitol, glycerol, and mixtures of said sugars and/or sugar alcohols with glycerol, water and/or glycols such as, for example, diethylene glycol and/or dipropylene glycol.

Said fatty acid or fatty acid monoester ii) is selected from polyhydroxy fatty acids, ricinoleic acid, hydroxyl-modified oils, hydroxyl-modified fatty acids and fatty acid esters based in myristoleic acid, palmitoleic acid, oleic acid, stearic acid, palmitic acid, vaccenic acid, petroselic acid, gadoleic acid, erucic acid, nervonic acid, linoleic acid, a- and g-linolenic acid, stearidonic acid, arachidonic acid, timnodonic acid, clupanodonic acid, cervonic acid and a mixture thereof. Fatty acids can be used as purely fatty acids. In this regard, preference is given to using fatty acid methyl esters such as, for example, biodiesel or methyl oleate.

Biodiesel is to be understood as meaning fatty acid methyl esters within the meaning of the EN 14214 standard from 2010. Principal constituents of biodiesel, which is generally produced from rapeseed oil, soybean oil or palm oil, are methyl esters of saturated $C_{16}$ to $C_{18}$ fatty acids and methyl esters of mono- or polyunsaturated $C_{18}$ fatty acids such as oleic acid, linoleic acid and linolenic acid.

Suitable alkylene oxides iii) having 2 to 4 carbon atoms are, for example, ethylene oxide, propylene oxide, tetrahydrofuran, 1,2-butylene oxide, 2,3-butylene oxide and/or styrene oxide. Alkylene oxides can be used singly, alternatingly in succession or as mixtures.

In one embodiment, the alkylene oxides comprise propylene oxide and ethylene oxide. In other embodiment, the alkylene oxide is a mixture of ethylene oxide and propylene oxide comprising more than 50 wt.-% of propylene oxide. In another embodiment, the alkylene oxide comprises purely propylene oxide.

In another embodiment, suitable chain extenders are selected from alkanol amines, diols and/or triols having molecular weights in between 49 g/mol to 499 g/mol. Suitable amounts of these chain extenders are known to the person skilled in the art. For instance, the chain extenders can be present in an amount up to 99 wt.-%, or up to 20 wt.-%, based on the total weight of the TPU.

In one embodiment, suitable chain extenders can be selected from ethylene glycol, diethylene glycol, triethylene glycol, propylene glycol, 1,3-propanediol, 1,4-butanediol, 1,5-pentanediol, 1,6-hexanediol, 1,4-butylene glycol, 1,5-pentylene glycol, methylpentanediol, 1,6-hexylene glycol, neopentyl glycol, trimethylolpropane, glycerol, pentaerythritol, diglycerol, dextrose, 1,4:3,6 dianhydrohexitol, hydroquinone bis 2-hydroxyethyl ether and bis-2(hydroxy ethyl)-terephthalate. In another embodiment, it can be selected from triethylene glycol, propylene glycol, 1,3-propanediol, 1,4-butanediol, 1,5-pentanediol, 1,6-hexanediol, 1,4-butylene glycol, 1,5-pentylene glycol, methylpentanediol and 1,6-hexylene glycol. In still another embodiment, it can be selected from triethylene glycol, propylene glycol, 1,3-propanediol, 1,4-butanediol, 1,5-pentanediol, 1,6-hexanediol and 1,4-butylene glycol. In yet another embodiment, the chain extender comprises 1,4-butanediol.

Accordingly, in an embodiment, the TPU in the embodiment 1 is obtained by reacting:
(a) polytetrahydrofuran having a hydroxyl number in between 10 mg KOH/g to 500 mg KOH/g,
(b) the isocyanate, and
(c) chain extender having molecular weight in between 49 g/mol to 499 g/mol.

In another embodiment, the TPU in the embodiment 1 is obtained by reacting:
(a) polytetrahydrofuran having a hydroxyl number in between 10 mg KOH/g to 500 mg KOH/g,
(b) the isocyanate, and
(c) 1,4-butanediol.

Suitable isocyanates for the present invention comprise an aliphatic isocyanate or an aromatic isocyanate. It is to be understood that the isocyanate includes both monomeric and polymeric forms of the aliphatic and aromatic isocyanate. By the term "polymeric", it is referred to the polymeric grade of the aliphatic and/or aromatic isocyanate comprising, independently of each other, different oligomers and homologues.

In an embodiment, the aliphatic isocyanate is selected from tetramethylene 1,4-diisocyanate, pentamethylene 1,5-diisocyanate, hexamethylene 1,6-diisocyanate, decamethylene diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, cyclobutane-1,3-diisocyanate, 1,2-, 1,3- and 1,4-cyclohexane diisocyanates, 2,4- and 2,6-methylcyclohexane diisocyanate, 4,4'- and 2,4'-dicyclohexyldiisocyanates, 1,3,5-cyclohexane triisocyanates, isocyanatomethylcyclohexane isocyanates, isocyanatoethylcyclohexane isocyanates, bis(isocyanatomethyl)-cyclohexane diisocyanates, 4,4'-diisocyanatodicyclohexylmethane, pentamethylene 1,5-diisocyanate, isophorone diisocyanate and mixtures thereof.

In one embodiment, the aromatic isocyanate is used for obtaining the TPU in the embodiment 1. Suitable aromatic isocyanate is selected from toluene diisocyanate; polymeric toluene diisocyanate, methylene diphenyl diisocyanate and/or polymeric methylene diphenyl diisocyanate; m-phenylene diisocyanate; 1,5-naphthalene diisocyanate; 4-chloro-1; 3-phenylene diisocyanate; 2,4,6-toluylene triisocyanate, 1,3-diisopropylphenylene-2,4-diisocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-diisopropyl ben-zene-2,4,6-triisocyanate, tolidine diisocyanate and 1,3,5-triisopropyl benzene-2,4,6-triisocyanate.

In other embodiment, the aromatic isocyanates are selected from toluene diisocyanate; polymeric toluene diisocyanate, methylene diphenyl diisocyanate and/or polymeric methylene diphenyl diisocyanate; m-phenylene diisocyanate; 1,5-naphthalene diisocyanate; 4-chloro-1; 3-phenylene diisocyanate; 2,4,6-toluylene triisocyanate, 1,3-diisopropylphenylene-2,4-diisocyanate; 1-methyl-3,5-diethylphenylene-2,4-diisocyanate. In yet other embodiment, the aromatic isocyanates comprise toluene diisocyanate; polymeric toluene diisocyanate, methylene diphenyl diisocyanate and/or polymeric methylene diphenyl diisocyanate; m-phenylene diisocyanate; 1,5-naphthalene diisocyanate; 4-chloro-1; 3-phenylene diisocyanate. In still other embodiment, the aromatic isocyanates are selected from toluene diisocyanate; polymeric toluene diisocyanate, methylene diphenyl diisocyanate and/or polymeric methylene diphenyl diisocyanate; m-phenylene diisocyanate. In a further embodiment, the isocyanate comprises methylene diphenyl diisocyanate and/or polymeric methylene diphenyl diisocyanate.

Methylene diphenyl diisocyanate is available in three different isomeric forms, namely 2,2'-methylene diphenyl diisocyanate (2,2'-MDI), 2,4'-methylene diphenyl diisocyanate (2,4'-MDI) and 4,4'-methylene diphenyl diisocyanate (4,4'-MDI). Methylene diphenyl diisocyanate can be classified into monomeric methylene diphenyl diisocyanate and polymeric methylene di-phenyl diisocyanate referred to as technical methylene diphenyl diisocyanate. Polymeric methylene diphenyl diisocyanate includes oligomeric species and methylene diphenyl diisocyanate isomers. Thus, polymeric methylene diphenyl diisocyanate may contain a single methylene diphenyl diisocyanate isomer or isomer mixtures of two or three methylene diphenyl diisocyanate isomers, the balance being oligomeric species. Polymeric methylene diphenyl diisocyanate tends to have isocyanate functionalities of higher than 2.0. The isomeric ratio as well as the amount of oligomeric species can vary in wide ranges in these products. For instance, polymeric methylene diphenyl diisocyanate may typically contain 30 wt.-% to 80 wt.-% of methylene diphenyl diisocyanate isomers, the balance being said oligomeric species. The methylene diphenyl diisocyanate isomers are often a mixture of 4,4'-methylene diphenyl diisocyanate, 2,4'-methylene diphenyl diisocyanate and very low levels of 2,2'-methylene di-phenyl diisocyanate.

In another embodiment, reaction products of isocyanates with polyols and their mixtures with other diisocyanates and polyisocyanates can also be used.

In still another embodiment, the isocyanate comprises a polymeric methylene diphenyl diisocyanate, as described hereinabove. Commercially available isocyanates available under the tradename, such as, but not limited to, Lupranat® from BASF can also be used for the purpose of the present invention.

Suitable amounts of isocyanates are such that the isocyanate index is in between 70 to 350, or in between 80 to 300. In one embodiment, the isocyanate index is in between 80 to 200, or 80 to 150, or 90 to 140. In another embodiment, it is in between 90 to 130, or 90 to 120, or 90 to 110. The isocyanate index describes the molar ratio of NCO groups to isocyanate reactive groups (polyol and chain extender). An index of 100 relates to the ratio of 1:1.

Accordingly, in an embodiment, the TPU in the embodiment 1 is obtained by reacting:
(a) polytetrahydrofuran having a hydroxyl number in between 10 mg KOH/g to 500 mg KOH/g,
(b) the aromatic isocyanate, and
(c) chain extender having molecular weight in between 49 g/mol to 499 g/mol.

In another embodiment, the TPU in the embodiment 1 is obtained by reacting:
(a) polytetrahydrofuran having a hydroxyl number in between 10 mg KOH/g to 500 mg KOH/g,
(b) methylene diphenyl diisocyanate and/or polymeric methylene diphenyl diisocyanate, and
(c) chain extender having molecular weight in between 49 g/mol to 499 g/mol.

In yet another embodiment, the TPU in the embodiment 1 is obtained by reacting:
(a) polytetrahydrofuran having a hydroxyl number in between 10 mg KOH/g to 500 mg KOH/g,
(b) methylene diphenyl diisocyanate and/or polymeric methylene diphenyl diisocyanate, and
(c) 1,4-butanediol.

In one embodiment, the TPU further comprises reinforcing agents. For the purpose of the present invention, reinforcing agent is selected from metal fiber, metalized inorganic fiber, metalized synthetic fiber, glass fiber, polyester fiber, polyamide fiber, polyvinyl alcohol fiber, aramid fiber, graphite fiber, carbon fiber, ceramic fiber, mineral fiber, basalt fiber, inorganic fiber, aramid fiber, kenaf fiber, jute fiber, flax fiber, hemp fiber, cellulosic fiber, sisal fiber and coir fiber.

In an embodiment, the reinforcing agent may be obtained in any shape and size. In another embodiment, the reinforcing agent is subjected to a surface treatment agent. The surface treatment agent is also referred to as sizing. The reinforcing agent when subjected to the surface treatment agent further improve the mechanical properties of the TPU. Typically, sizing provides adhesion between the reinforcing agent and the TPU.

In another embodiment, the surface treatment agent is a coupling agent and is selected from silane coupling agent, titanium coupling agent and aluminium coupling agent.

In one embodiment, the coupling agent comprises silane coupling agent. Suitable silane coupling agents are selected from aminosilane, epoxysilane, methyltrimethoxysilane, methyltriethoxysilane, γ-glycidoxypropyltrimethoxysilane, vinyltriacetoxysilane and vinyltrimethoxysilane.

Suitable amounts of the reinforcing agent in the TPU are well known to the person skilled in the art. In one embodiment, the amount of the reinforcing agent, as described herein, is such that the weight ratio between the reinforcing agent and the TPU is in between 0.01:1.0 to 1.0:1.0.

In still another embodiment, the TPU can be obtained in the presence of catalysts and/or additives. Suitable catalysts are well known to the person skilled in the art. For instance, tertiary amine and phosphine compounds, metal catalysts such as chelates of various metals, acidic metal salts of strong acids; strong bases, alcoholates and phenolates of various metals, salts of organic acids with a variety of metals, organometallic derivatives of tetravalent tin, trivalent and pentavalent As, Sb and Bi and metal carbonyls of iron and cobalt and mixtures thereof can be used as catalysts.

In one embodiment, tertiary amines include, such as but not limited to, triethylamine, tributylamine, N-methylmorpholine, N-ethylmorpholine, N,N, N', N'-tetramethylethylenediamine, pentamethyl-diethylenetriamine and higher homologues (as described in, for example, DE-A 2,624,527 and 2,624,528), 1,4-diazabicyclo(2.2.2)octane, N-methyl-N'-dimethyl-aminoethylpiperazine, bis-(dimethylaminoalkyl)piperazines, tris(dimethylaminopropyl)hexahydro-1,3,5-triazin, N,N-dimethylbenzylamine, N,N-dimethylcyclohexylamine, N,N-diethyl-benzylamine, bis-(N,N-diethylaminoethyl) adipate, N,N,N',N'-tetramethyl-1,3-butanediamine, N,N-dimethyl-p-phenylethylamine, 1,2-dimethylimidazole, 2-methylimidazole, monocyclic and bicyclic amines together with bis-(dialkylamino)alkyl ethers, such as 2,2-bis-(dimethylaminoethyl)ether. Triazine compounds, such as, but not limited to, tris(dimethylaminopropyl)hexahydro-1,3,5-triazin can also be used.

In other embodiment, metal catalysts include, such as but not limited to, metal salts and organometallics comprising tin-, titanium-, zirconium-, hafnium, bismuth-, zinc-, aluminium- and iron compounds, such as tin organic compounds, preferably tin alkyls, such as dimethyltin or diethyltin, or tin organic compounds based on aliphatic carboxylic acids, preferably tin diacetate, tin dilaurate, dibutyl tin diacetate, dibutyl tin dilaurate, bismuth compounds, such as bismuth alkyls or related compounds, or iron compounds, preferably iron-(II)-acetylacetonate or metal salts of carboxylic acids, such as tin-II-isooctoate, tin dioctoate, titanium acid esters or bismuth-(III)-neodecanoate or a combination thereof.

The catalysts, as described hereinabove, can be present in amounts up to 20 wt.-%, based on the total weight of the TPU.

In another embodiment, additives are selected from alkylene carbonates, carbonamides, pyrrolidones, fillers, flame retardants, dyes, pigments, IR absorbing materials, UV stabilizers, plasticizers, antistats, fungistats, bacteriostats, hydrolysis controlling agents, antioxidants, cell regulators and mixtures thereof. Further details regarding additives can be found, for example, in the Szycher's Handbook of Polyurethanes, $2^{nd}$ edition, 2013. Suitable amounts of these additives are well known to the person skilled in the art. However, for instance, the additives can be present in amounts up to 20 wt.-% based on the total weight of the TPU.

Jounce Bumper (20)

As shown in FIG. 1, the dual-rate jounce bumper (20) limits jounce travel between the first component (22) and the second component (24) of the vehicle (26) wherein the second component (24) is spaced from and moveable towards the first component (22) along the jounce axis. For example, the dual-rate jounce bumper (20) can be used with a suspension system (28) of the vehicle (26) to limit movement of the suspension system (28) towards a frame member (30) of the vehicle (26). In such an example, limiting the jounce between the suspension system (28) and the frame member (30) of the vehicle (26) limits and/or prevents transmission of an impact force experienced by the suspension system (28), such as when the vehicle (26) travels over a bump, to the frame member (30). Said otherwise, the dual-rate jounce bumper (20) provides a cushion between elements of the suspension system (28) and the frame member (30) by gradually stiffening the suspension system (28) as the suspension system (28) approaches an end of its maximum jounce travel, i.e. before elements of the suspension system (28) contact the frame member (30) of the vehicle (26).

In one embodiment, the dual-rate jounce bumper (20) in the embodiment 1 is in alignment with the jounce axis JA to ensure the second component (24) contacts the dual-rate jounce bumper (20) as the second component (24) moves towards the first component (22) to limit jounce. When the second component (24) is the suspension system (28) of the vehicle (26), the dual-rate jounce bumper (20) is disposed between elements of the suspension system (28), such as strut assembly (32), and the frame member (30) of the vehicle (26), thereby separating the elements of the suspension system (28) and the frame member (30). By separating the elements of the suspension system (28) and the frame member (30), the dual-rate jounce bumper (20) prevents the components of the suspension system (28) from directly impacting the frame member (30) as the suspension system (28) absorbs the energy generated by the impact force.

In one embodiment, the second component (24) in the embodiment 1 is the strut assembly (32), which comprises a cylinder (34) and a piston rod (36) displaceable relative to the cylinder (34) along the jounce axis JA. An end (38) of the piston rod (36) is coupled to the first component (22), which in this case is the frame member (30), for coupling the suspension system (28) to the frame member (30) of the vehicle (26). It is to be understood that the dual-rate jounce bumper (20) can be disposed between any element of the vehicle (26).

In another embodiment, the bumper (40) in the embodiment 1 has a cylindrical configuration. However, it is to be appreciated that the bumper (40) can be of any suitable configuration. A diameter D of the bumper (40) can vary along a length L of the bumper (40).

Figure 3:
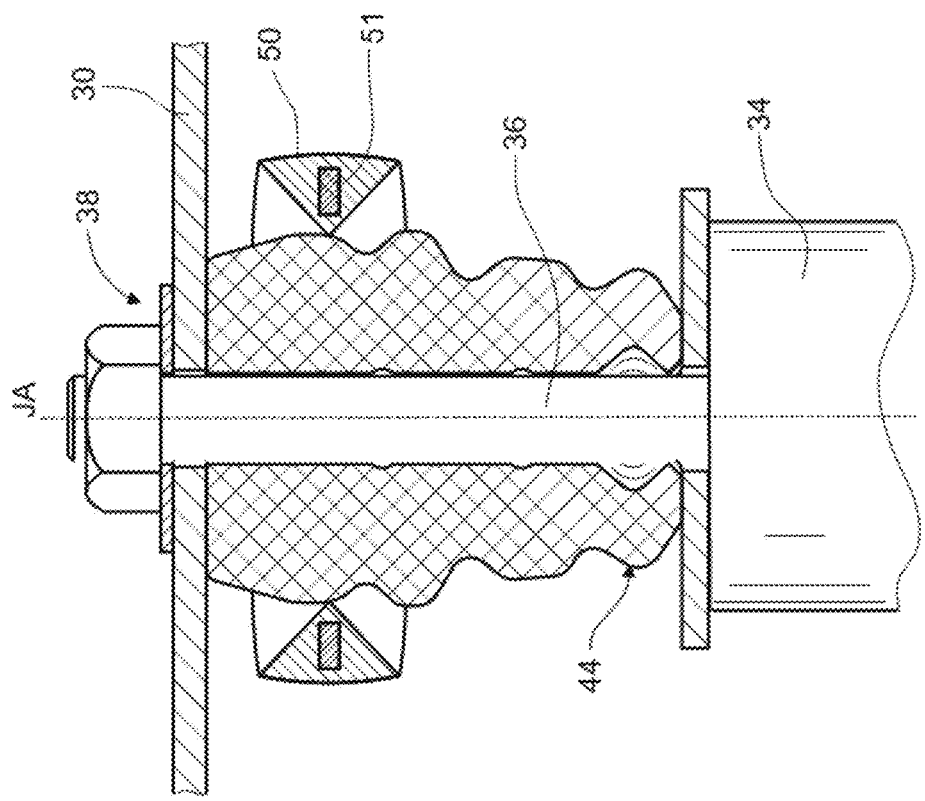
FIG. 3 is a cross-sectional view of a portion of the dual-rate jounce bumper (20) of FIG. 2.

In another embodiment, the bumper (40) in the embodiment 1 has a first end (42) and a second end (44) spaced from the first end (42). This is shown in FIG. 3. In one embodiment, the first end (42) of the bumper (40) is coupled to the first component (22) with the second end (44) contacting the second component (24) as the second component (24) moves along the jounce axis JA towards the first component (22). However, it is to be appreciated that the first end (42) of the bumper (40) can be coupled to the second component (24), such that the bumper (40) moves with the second component (24) along the jounce axis JA. In such an embodiment, the second end (44) of the bumper (40) would contact the first component (22).

In another embodiment, the second component (24) moves towards first component (22) as the result of a force being applied to the second component (24). The bumper (40) is disposed between the first component (22) and the second component (24) for limiting the jounce of the second component (24) along the jounce axis JA because of the force applied on the second component (24). Said otherwise, the bumper (40) prevents direct contact between the first component (22) and the second component (24).

In still another embodiment, the bumper (40) in the embodiment 1 can be made of a material that is resilient.

Such resilient materials are able to spring back to shape after being compressed. Suitable examples of these materials include, such as but not limited to, microcellular urethane, rubber and mixtures thereof.

In another embodiment, as the bumper (40) in the embodiment 1 is compressed, movement of the second component (24) along the jounce axis JA is resisted, which limits jounce. Additionally, the compression of the bumper (40) absorbs some, if not all, of the energy applied to the second component (24), thereby preventing the second component (24) from contacting the first component (22). The bumper (40) dampens the force acting on the second component (24) until the bumper (40) reaches a maximum compression. Once the bumper (40) reaches the maximum compression, the remaining force is transferred to the first component (22).

Figure 2:
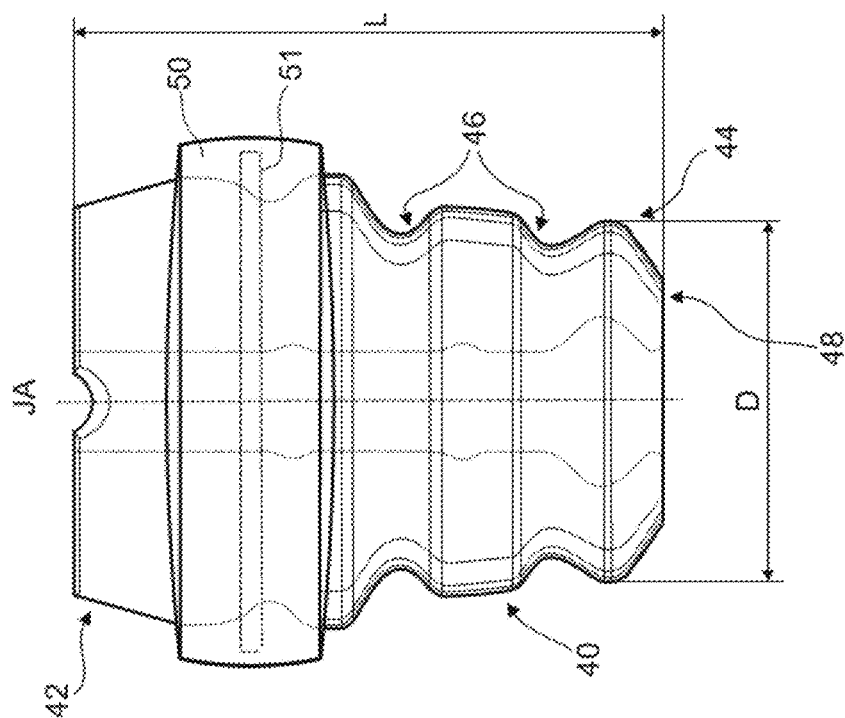
FIG. 2 is a front view of an embodiment of the dual-rate jounce bumper (20) having an outer member (50) disposed on a bumper (40).

In yet another embodiment, the bumper (40) in the embodiment 1 has at least one groove (46) for controlling movement of the bumper (40) as the bumper (40) is compressed. This is shown in FIG. 2. The groove (46) can reduce the stiffness of the bumper (40) at the location of the groove (46) for controlling the compression of the bumper (40). Additionally, groove (46) allows the bumper (40) to be compressed along the jounce axis JA. In one embodiment, the groove (46) allows the bumper (40) in the embodiment 1 to be compressed uniformly along the jounce axis JA. In another embodiment, the groove (46) minimizes lateral expansion of the bumper (40) when the bumper (40) is compressed.

Figure 5:
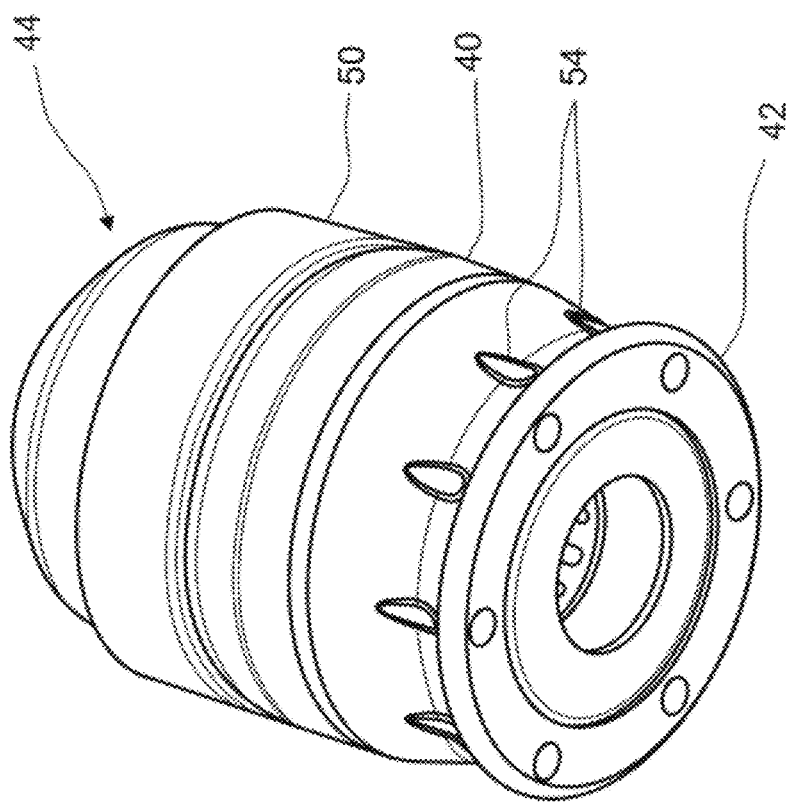
FIG. 5 is a perspective view of the dual-rate jounce bumper (20) of FIG. 4.
Figure 4:
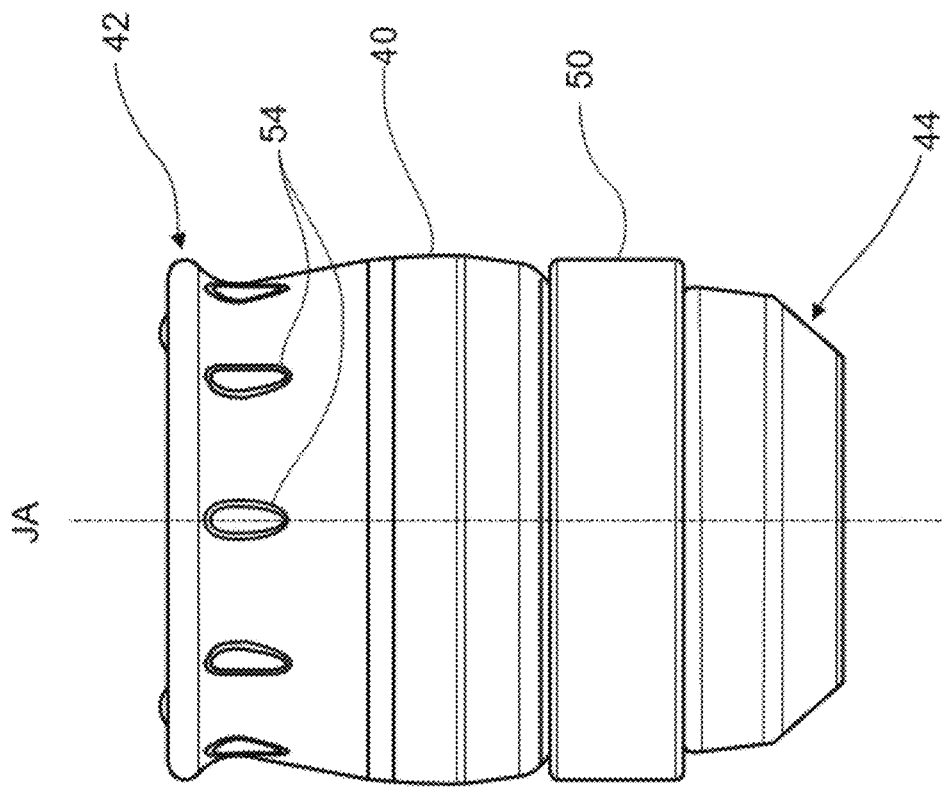
FIG. 4 is a front view of another embodiment of the dual-rate jounce bumper (20) having the outer member (50) disposed on the bumper (40) with plurality of embossments (54).

In another embodiment, the bumper (40) in the embodiment 1 has a plurality of embossments (54). This is shown in FIGS. 4 and 5. In one embodiment, the plurality of embossments (54) is present equidistantly on the circumference of the bumper (40). The embossments (54) may be carved on the circumference of the bumper (40) at appropriate location, for instance, immediately below the first end (42) of the bumper (40). These embossments (54) provide a mechanism for air to escape when bumper (40) is compressed. The embossments (54) on the outside of the bumper (40) provide constant contact to bumper cup (not shown in FIGS.) even under the piston rod (36) articulation and bumper (40) dimensional variance.

Although, the present invention describes the presence of at least one groove (46) or plurality of embossments (54) on the bumper (40), it is to be understood that other surface modifications conceived by the person skilled in the art also possible.

In a further embodiment, the first component (22) is the frame member (30) of the vehicle (26) and the second component (24) is the suspension system (28) of the vehicle (26) in the embodiment 1. In such an embodiment, the dual-rate jounce bumper (20) is coupled to the frame member (30) such that the dual-rate jounce bumper (20) remains stationary and the cylinder (34) moves into contact with the dual-rate jounce bumper (20).

In another embodiment, the dual-rate jounce bumper (20) in the embodiment 1 is coupled to the cylinder (34) of the strut assembly (32) such that the dual-rate jounce bumper (20) moves with the cylinder (34).

In one embodiment, the force generated on the second component (24) is the impact force generated in the suspension system (28) as the vehicle (26) travels over a bump. If the impact force is greater than the suspension system (28) can dampen, the components of the suspension system (28), such as the strut assembly (32), contact and compress the bumper (40). In such an embodiment, the bumper (40) may define a clearance hole (48) for receiving the piston rod (36) of the strut assembly (32) such that the piston rod (36) is disposed through the bumper (40) for disposing the bumper (40) between the cylinder (34) of the strut assembly (32) and the frame member (30) of the vehicle (26). Therefore, the cylinder (34) of the strut assembly (32) will contact the bumper (40) as the piston rod (36) collapses into the cylinder (34), thereby dampening the force acting on the strut assembly (32).

In one embodiment, the outer member (50) is disposed about said bumper (40) and is capable of limiting the radial expansion of said bumper (40) as said bumper (40) is compressed for increasing the stiffness of the bumper (40). The outer member (50) is obtained by overmolding stainless steel with the TPU having the shore hardness ranging from a Shore D hardness of 50 to a Shore D hardness of 80 determined according to ASTM D2240-15e1. It is to be understood here that the term "capable of limiting the radial expansion" includes the capability of the outer member (50) to prevent the radial expansion of the bumper (40). Said otherwise, the outer member (50) of the bumper (40) does not expand radially at all.

In another embodiment, the outer member (50) in the embodiment 1 has a hollow interior such that the bumper (40) is disposed within said hollow interior. The outer member (50) can have any suitable configuration which can be disposed about the bumper (40), so as to completely or loosely fit the bumper (40). In another embodiment, the outer member (50) in the embodiment 1 is fixed to the bumper (40) due to its configuration and has minimal movement in the axial direction. Said otherwise, the outer member (50) has minimal or in fact no movement along the jounce axis JA. In such an embodiment, no additional means is required to fix the outer member (50) to the bumper (40).

Suitable configurations of the outer member (50) are known to the person skilled in the art. However, in one embodiment, the outer member (50) in the embodiment 1 has a ring-shaped configuration defining the hollow interior. The bumper (40) is disposed within the hollow interior of the outer member (50). It is to be appreciated that the bumper (40) can be held within the outer member (50) by any suitable means known to the person skilled in the art.

As the bumper (40) is compressed, the bumper (40) expands radially. Eventually, the bumper (40) reaches the maximum compression and thus the maximum radial expansion. The increase in stiffness of the bumper (40) allows the dual-rate jounce bumper (20) to absorb more energy than bumpers with lower stiffness.

In an embodiment, the bumper (40) in the embodiment 1 is not radially expandable radially relative to the bumper (40), thereby limiting or preventing the radial expansion of the bumper (40). In another embodiment, the outer member (50) is radially expandable relative to the bumper (40) while still limiting the radial expansion of the bumper (40). As such, the outer member (50) has a stiffness different than the stiffness of the bumper (40).

In one embodiment, the outer member (50) in the embodiment 1 has the stiffness greater than the stiffness of the bumper (40). Adjusting the stiffness of the outer member (50) controls the compression of the bumper (40). For example, the stiffness of the outer member (50) can be adjusted such that the bumper (40) is compressible to a predetermined value by the second component (24) before the outer member (50) begins to radially expand. Said otherwise, the radial expansion of the bumper (40) and the outer member (50) can be two-stages, such that the bumper (40) is compressed and expands first and then the outer member (50) expands. For example, as the bumper (40) is compressed, the bumper (40) expands radially into the outer member (50). The outer member (50) may initially resist the radial expansion which prevents further expansion of the bumper (40). Then, as the force continues to act on the bumper (40), the outer member (50) begins to radially expand, and the bumper (40) continues to expand radially. The radial expansion of the outer member (50) allows the dual-stage dual-rate jounce bumper (20) to absorb more energy.

Figure 6A:
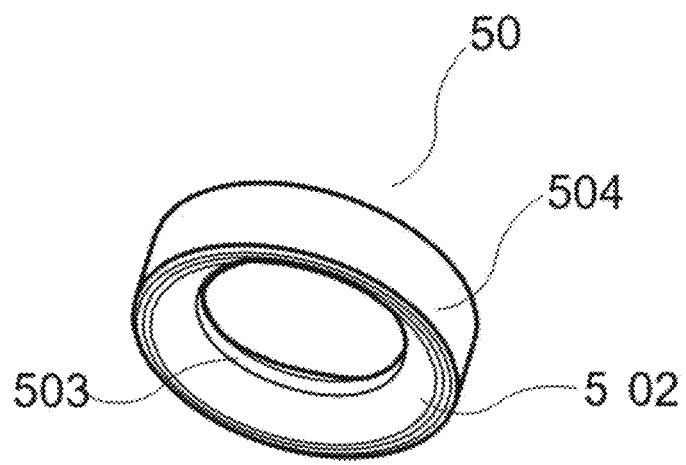
FIG. 6A is a perspective view of the outer member (50).

In another embodiment, the outer member (50) in the embodiment 1 comprises an upper surface (501), a lower surface (502), a first wall (503) and a second wall (504). This is shown in FIG. 6A. The upper surface (501), the lower surface (502), the first wall (503) and the second wall (504), independent of each other, is a uniform surface or a non-uniform surface. By "uniform surface", it is referred to a smooth surface, such as but not limited to, an arcuate or a flat surface. By "non-uniform", it is referred to a rough surface. Said otherwise, the non-uniform surface is not a smooth surface and may have a plurality of surface characteristics, such as but not limited to, serrations, ridges, sawtooth, saw-edged, toothed, zigzag, notched and indented.

In another embodiment, each of the upper surface (501) and the lower surface (502) is a uniform surface. Particularly, the upper surface (501) and the lower surface (502) is an arcuate surface. The arcuate surface controls the radial expansion of the outer member (50), thereby limiting the radial expansion of the bumper (40). By "arcuate surface", it is referred to a curved surface, for instance, a concave surface or a convex surface. In one embodiment, each of the upper surface (501) and the lower surface (502) is a concave surface, i.e. the said surfaces curve inwards. In another embodiment, the upper surface (501) is a concave surface while the lower surface (502) is a flat surface.

In one embodiment, the upper surface (501) and the lower surface (502) are inclined towards each other. In another embodiment, the upper surface (501), the first wall (503), the lower surface (502) and the second wall (504) are all connected to form a triangular cross section when viewed along the frontal plane (BB). In such an embodiment, the triangular cross section is defined by a first side (505), a second side (506) and a third side (507). In one embodiment, the first side (505) is formed from the upper surface (501), particularly the concave surface in the upper surface (501), as described herein. Similarly, the second side (506) is formed from the lower surface (502), particularly the concave surface in the lower surface (502).

In one embodiment, the first side (505) and the second side (506) of the triangular cross section subtend an angle θ therebetween. This is shown in FIG. 6C. In another embodiment, the angle θ is in between 30° to 90°. In yet another embodiment, it is in between 40° to 90°, or 45° to 90°, or 50° to 90°. In a further embodiment, it is in between 55° to 90°, or 60° to 90°, or 65° to 90°. In another embodiment, it is in between 70° to 90°, or 75° to 90°, or 75° to 85°. In a still further embodiment, the angle θ is 80°.

In another embodiment, the outer member (50) has a thickness defined by the relative positioning of the first wall (503) and the second wall (504). Said otherwise, the thickness of the outer member (50) is defined by the separation between the first wall (503) and the second wall (504). The thickness of the outer member (50) is decided based on several parameters, such as but not limited to, the vehicle (26) category (for example, truck, car, lorry, etc.), load carrying capacity, thickness of the stainless steel and the amount of TPU used for overmolding. Suitable thickness of the outer member (50) can be selected by the person skilled in the art, however, in an embodiment, the outer member (50) in the embodiment 1 has the thickness ranging between 1.0 to 10.0 mm. In another embodiment, it is in between 2.0 mm to 10.0 mm, or 2.0 mm to 9.0 mm, or 3.0 mm to 9.0 mm. In yet another embodiment, it is in between 3.0 mm to 9.5 mm, or 4.0 mm to 9.5 mm, or 5.0 mm to 9.5 mm.

In one embodiment, the stainless steel in the embodiment 1 is a stainless-steel ring (52). For instance, the stainless-steel ring (52) can be a vertical ring or a horizontal ring. By "vertical ring", it is referred to the stainless-steel ring (52) having a height more than its thickness. By "horizontal ring", it is referred to the stainless-steel ring (52) having the thickness more than its height. In an embodiment, the stainless steel in the embodiment 1 is the vertical stainless-steel ring (52). In another embodiment, the stainless steel in the embodiment 1 is the horizontal stainless-steel ring (52). The horizontal stainless-steel ring is shown in FIG. 3 and FIG. 6C.

In another embodiment, the stainless-steel ring (52) is not preferred to have a circular cross section, particularly for use in the outer member (50) in the embodiment 1, as it would result in an increase in the weight of the stainless-steel ring (52) for a similar dimension of a triangular cross-section, as described herein. This will be counterproductive in achieving the objectives of the present invention and therefore, reduce the performance of the jounce bumper (20).

In one embodiment, the stainless-steel ring (52) in the outer member (50) in the embodiment 1 has the thickness ranging between 1.0 mm to 3.0 mm. In another embodiment, it is in between 1.5 mm to 3.0 mm.

In another embodiment, the outer member (50) in the embodiment 1 can be obtained by overmolding the stainless steel with a plastic material, in addition to TPU. Suitable plastic material is known to the person skilled in the art. However, in one embodiment, the plastic material can be selected from thermoplastic polymer, such as but not limited to, polypropylene, polyamide, polyphthalamide, polybutylene terephthalate, polyethylene or a mixture thereof. Additionally, these plastic materials may be reinforced with suitable reinforcing agents, as described herein.

In one embodiment, the overmolding in the embodiment 1 is carried out at a temperature ranging between 200° C. to 240° C.

In another embodiment, the overmolding in the embodiment 1 is injection overmolding. Suitable overmolding techniques for the present invention are well known to the person skilled in the art. For instance, overmolding can be performed by arranging a heated injection barrel with a screw shaft arranged inside and linked to a hopper containing the TPU granules. The TPU is then fed into the injection barrel where it is heated and by the action of screw shaft, injected in a molten condition through a nozzle. In a further embodiment, the plastic material can be blended with the TPU and granules be injected in the molten condition through the nozzle. In one embodiment, the injection barrel has a temperature in between 210° C. to 230° C., while the nozzle has a temperature in between 220° C. to 240° C.

In another embodiment, the dual-rate jounce bumper (20) in the embodiment 1 is connected to the strut assembly (32), and, more specifically to the cylinder (34) of the strut assembly (32) for connecting the dual-rate jounce bumper (20) to the strut assembly (32). Because the strut assembly (32) is coupled to the frame member (30), connecting the dual-rate jounce bumper (20) to the cylinder (34) of the strut assembly (32) also connects the dual-rate jounce bumper (20) to the vehicle (26). However, it is to be appreciated that the dual-rate jounce bumper (20) can be connected to the frame member (30) for connecting the dual-rate jounce bumper (20) to the vehicle (26).

The dual-rate jounce bumper (20) in the embodiment 1, as described herein, limits the jounce travel in the vehicle (26) body, is capable of bearing loads upto 150 kN, minimises NVH, prevents suspension overtravel, is light in weight and cost effective. In particular, these advantages are attributed to the outer member (50) disposed about the bumper (40), said outer member (50) obtained by overmolding stainless steel with the TPU having the shore hardness ranging from a Shore D hardness of 50 to a Shore D hardness of 80.

Another aspect of the present invention is embodiment 2 which is directed to a vehicle (26) comprising:
the frame member (30) having the first component (22),
the suspension having the second component (24), and
the dual-rate jounce bumper (20) of the embodiment 1.

Yet another aspect of the present invention is embodiment 3 which is directed to a ring obtained by overmolding stainless steel with the TPU having a shore hardness ranging from a Shore D hardness of 50 to a Shore D hardness of 80 determined according to ASTM D2240-15e1, said ring comprising an upper surface, a lower surface, a first wall and a second wall with said upper surface and said lower surface being inclined towards each other, wherein each of the upper surface and the lower surface is an arcuate surface. This is shown in FIG. 6A.

In the present context, the TPU referred herein is the same as the TPU described in the embodiment 1 or 2. In one embodiment, the outer member (50) in the embodiment 1 or 2 is the ring of embodiment 3.

In another embodiment, each of the upper surface and the lower surface is the arcuate surface, as described herein. In one embodiment, each of the upper surface and the lower surface in the embodiment 3 is the concave surface, i.e. the said surfaces curve inwards. In another embodiment, the upper surface is the concave surface while the lower surface is the flat surface in the embodiment 3.

Figure 6B:
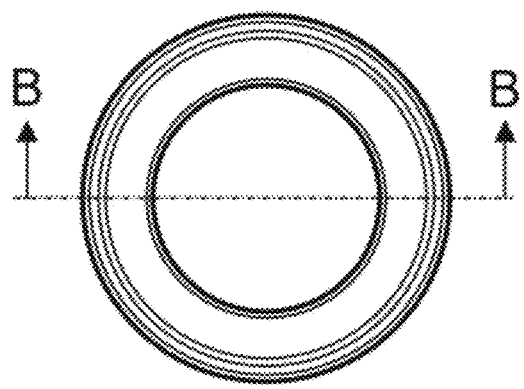
FIG. 6B is a top view of the outer member (50).
Figure 6C:
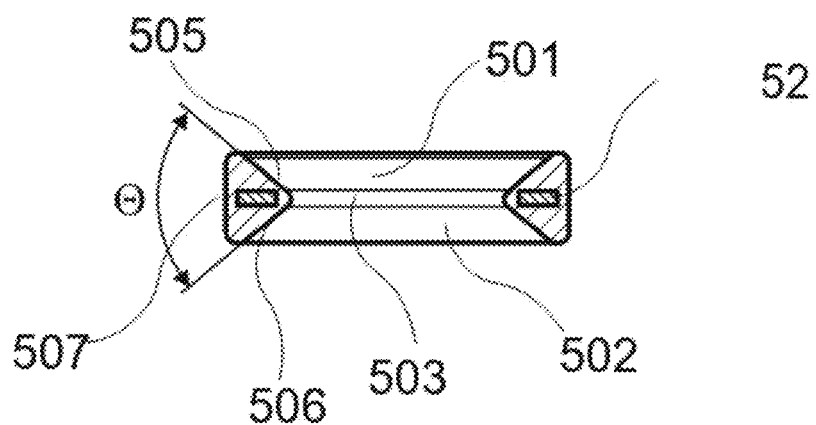
FIG. 6C is cross-sectional view of outer member (50) across frontal plane (BB).

In another embodiment, the upper surface, the first wall, the lower surface and the second wall in the embodiment 3 are all connected to form a triangular cross section when viewed along the frontal plane (BB), as shown in FIG. 6B and FIG. 6C. In such an embodiment, the triangular cross section is defined by a first side, a second side and a third side. In one embodiment, the first side is formed from the upper surface, particularly the concave surface in the upper surface, as described herein. Similarly, the second side is formed from the lower surface, particularly the concave surface in the lower surface.

In another embodiment, the first side and the second side of the triangular cross section subtend an angle θ therebetween. In another embodiment, the angle θ is in between 30° to 90°. In yet another embodiment, it is in between 40° to 90°, or 45° to 90°, or 50° to 90°. In a further embodiment, it is in between 55° to 90°, or 60° to 90°, or 65° to 90°. In another embodiment, it is in between 70° to 90°, or 75° to 90°, or 75° to 85°. In a still further embodiment, the angle θ is 80°.

In another embodiment, the ring has a thickness defined by the relative positioning of the first wall and the second wall. Said otherwise, the thickness of the ring is defined by the separation between the first wall and the second wall. Suitable thickness can be selected by the person skilled in the art depending on the desired application of the ring, however, in an embodiment, the ring has the thickness ranging between 1.0 to 10.0 mm. In another embodiment, it is in between 2.0 mm to 10.0 mm, or 2.0 mm to 9.0 mm, or 3.0 mm to 9.0 mm. In yet another embodiment, it is in between 3.0 mm to 9.5 mm, or 4.0 mm to 9.5 mm, or 5.0 mm to 9.5 mm.

In one embodiment, the stainless-steel in the embodiment 3 is a stainless-steel ring (52). For instance, the stainless-steel ring (52) can be a vertical ring or a horizontal ring. By "vertical ring", it is referred to the stainless-steel ring (52) having a height more than its thickness. By "horizontal ring", it is referred to the stainless-steel ring (52) having the thickness more than its height. In an embodiment, the stainless steel in the embodiment 1 is the vertical stainless-steel ring (52). In another embodiment, the stainless steel in the embodiment 1 is the horizontal stainless-steel ring (52).

In one embodiment, the stainless-steel ring (52) in the ring in the embodiment 3 has the thickness ranging between 1.0 mm to 3.0 mm. In another embodiment, it is in between 1.5 mm to 3.0 mm.

In another embodiment, the ring in the embodiment 3 can be obtained by overmolding the stainless steel with the plastic material, in addition to the TPU, as described herein.

In one embodiment, the overmolding in the embodiment 1 is carried out at a temperature ranging between 200° C. to 240° C.

In another embodiment, the overmolding in the embodiment 3 is injection overmolding. Suitable overmolding techniques for the present invention are well known to the person skilled in the art. For instance, overmolding can be performed by arranging a heated injection barrel with a screw shaft arranged inside and linked to a hopper containing the TPU granules. The TPU is then fed into the injection barrel where it is heated and by the action of screw shaft, injected in a molten condition through a nozzle. In a further embodiment, the plastic material can be blended with the TPU and granules be injected in the molten condition through the nozzle. In one embodiment, the injection barrel has a temperature in between 210° C. to 230° C., while the nozzle has a temperature in between 220° C. to 240° C.

LIST OF REFERENCE NUMERAL

| | |
|---|---|
| 20 | Jounce bumper |
| 22 | First component |
| 24 | Second component |
| 26 | Vehicle |
| 28 | Suspension system |
| 30 | Frame member |
| 32 | Strut assembly |
| 34 | Cylinder |
| 36 | Piston rod |
| 38 | End |
| 40 | Bumper |
| 42 | First end |
| 44 | Second end |
| 46 | Groove |
| 48 | Clearance hole |
| 50 | Outer member |
| 52 | Stainless-steel ring |
| 54 | Embossment |
| 501 | Upper surface |
| 502 | Lower surface |
| 503 | First wall |
| 504 | Second wall |
| 505 | First side |
| 506 | Second side |
| 507 | Third side |

The present invention is illustrated in more detail by the following embodiments and combinations of embodiments which result from the corresponding dependency references and links:

I. A dual-rate jounce bumper (20) for limiting a jounce travel between a first component (22) and a second component (24) of a vehicle (26) with the second component (24) spaced from and moveable towards the first component (22) along a jounce axis, said jounce bumper (20) comprising:
a bumper (40) having a first end (42) for coupling to the first component (22) and a second end (44) spaced from said first end (42) for contacting the second component (24) with said bumper (40) compressible between the first and the second components (22, 24) for limiting jounce with said bumper (40) radially expandable as said bumper (40) is compressed, and
an outer member (50) disposed about said bumper (40) and capable of limiting the radial expansion of said bumper (40) as said bumper (40) is compressed for increasing a stiffness of the bumper (40),
wherein said outer member (50) is obtained by over-molding stainless steel with a thermoplastic polyurethane having a shore hardness ranging from a Shore D hardness of 50 to a Shore D hardness of 80 determined according to ASTM D2240-15e1.

II. The dual-rate jounce bumper (20) according to embodiment I, wherein the outer member (50) has a hollow interior such that the bumper (40) is disposed within said hollow interior.

III. The dual-rate jounce bumper (20) according to embodiment I or II, wherein the outer member (50) comprises an upper surface, a lower surface, a first wall and a second wall.

IV. The dual-rate jounce bumper (20) according to embodiment III, wherein the upper surface and the lower surface are inclined towards each other.

V. The dual-rate jounce bumper (20) according to embodiment III or IV, wherein each of the upper surface and the lower surface is an arcuate surface.

VI. The dual-rate jounce bumper (20) according to one or more of embodiments I to V, wherein the upper surface, the first wall, the lower surface and the second wall are all connected to form a triangular cross section when viewed along the frontal plane (BB).

VII. The dual-rate jounce bumper (20) according to embodiment VI, wherein the triangular cross section is defined by a first side, a second side and a third side, said first side and second side forming an angle θ therebetween.

VIII. The dual-rate jounce bumper (20) according to embodiment VII, wherein the angle θ is in between 30° to 90°.

IX. The dual-rate jounce bumper (20) according to embodiment VI or VII, wherein the angle θ is 80°.

X. The dual-rate jounce bumper (20) according to one or more of embodiments III to IX, wherein the outer member (50) has a thickness defined by the relative positioning of the first wall and the second wall.

XI. The dual-rate jounce bumper (20) according to embodiment X, wherein the outer member (50) has the thickness ranging between 1.0 mm to 10.0 mm.

XII. The dual-rate jounce bumper (20) according to one or more of embodiments I to XI, wherein the stainless steel is a stainless-steel ring (52).

XIII. The dual-rate jounce bumper (20) according to embodiment XII, wherein the stainless-steel ring (52) has a thickness ranging between 1.0 mm to 3.0 mm.

XIV. The dual-rate jounce bumper (20) according to one or more of embodiments I to XIII, wherein the thermoplastic polyurethane has the shore hardness ranging from Shore D hardness of 60 to Shore D hardness of 80 determined according to ASTM D2240-15e1.

XV. The dual-rate jounce bumper (20) according to one or more of embodiments I to XIV, wherein the thermoplastic polyurethane is obtained by reacting:
(a) a polyol,
(b) an isocyanate, and
(c) optionally a chain extender.

XVI. The dual-rate jounce bumper (20) according to embodiment XV, wherein the polyol is selected from polyether polyol, polyester polyol, polyether-ester polyol and a mixture thereof.

XVII. The dual-rate jounce bumper (20) according to embodiment XV or XVI, wherein the polyol comprises a polyether polyol.

XVIII. The dual-rate jounce bumper (20) according to embodiment XVII, wherein the polyether polyol has an average functionality in between 1.9 to 2.1 and a hydroxyl number in between 10 mg KOH/g to 500 mg KOH/g.

XIX. The dual-rate jounce bumper (20) according to one or more of embodiments XV to XVIII, wherein the isocyanate comprises an aliphatic isocyanate or an aromatic isocyanate.

XX. The dual-rate jounce bumper (20) according to one or more of embodiments XV to XIX, wherein the isocyanate comprises aromatic isocyanate.)

XXI. The dual-rate jounce bumper (20) according to embodiment XIX or XX, wherein the aromatic isocyanate is selected from toluene diisocyanate; polymeric toluene diisocyanate, methylene diphenyl diisocyanate and/or polymeric methylene diphenyl diisocyanate; m-phenylene diisocyanate; 1,5-naphthalene diisocyanate; 4-chloro-1; 3-phenylene diisocyanate; 2,4,6-toluylene triisocyanate, 1,3-diisopropylphenylene-2,4-diisocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxyphenyl-2,5-diisocyanate; 1,3,5-triethyl benzene-2,4,6-triisocyanate; 1-ethyl-3,5-diisopropyl ben-zene-2,4,6-triisocyanate, tolidine diisocyanate and 1,3,5-triisopropyl benzene-2,4,6-triisocyanate.

XXII. The dual-rate jounce bumper (20) according to embodiment XX or XXI, wherein the aromatic isocyanate comprises methylene diphenyl diisocyanate and/or polymeric methylene diphenyl diisocyanate.

XXIII. The dual-rate jounce bumper (20) according to one or more of embodiments XV to XXII, wherein the chain extender has a molecular weight in between ≥49 g/mol to ≥499 g/mol.)

XXIV. The dual-rate jounce bumper (20) according to one or more of embodiments XV to XXIII, wherein the chain extender is selected from ethylene glycol, diethylene glycol, triethylene glycol, propylene glycol, 1,3-propanediol, 1,4-butanediol, 1,5-pentanediol, 1,6-hexanediol, 1,4-butylene glycol, 1,5-pentylene glycol, methylpentanediol, 1,6-hexylene glycol, neopentyl glycol, trimethylolpropane, glycerol, pentaerythritol, diglycerol, dextrose, 1,4:3,6 dianhydrohexitol, hydroquinone bis 2-hydroxyethyl ether and bis-2(hydroxyethyl)-terephthalate.)

XXV. The dual-rate jounce bumper (20) according to one or more of embodiments XV to XXIV, wherein the chain extender comprises 1,4-butanediol.

XXVI. The dual-rate jounce bumper (20) according to one or more of embodiments I to XXV, wherein the dual-rate jounce bumper (20) is capable of bearing loads upto 150 kN.

XXVII. A vehicle (26) comprising:
a frame member (30) having the first component (22),
a suspension having the second component (24), and
a dual-rate jounce bumper (20) according to one or more of embodiments I to XXVI.

XXVIII. A ring obtained by overmolding stainless steel with a thermoplastic polyurethane having a shore hardness ranging from a Shore D hardness of 50 to a Shore D hardness of 80 determined according to ASTM D2240-15e1, said ring comprising an upper surface, a lower surface, a first wall and a second wall with said upper surface and said lower surface being inclined towards each other, wherein each of the upper surface and the lower surface is an arcuate surface.

XXIX. The ring according to embodiment XXVIII, wherein the upper surface, the first wall, the lower surface and the second wall are all connected to form a triangular cross section when viewed along the frontal plane (BB).

XXX. The ring according to embodiment XXIX, wherein the triangular cross section is defined by a first side, a second side and a third side, said first side and second side forming an angle θ therebetween.

XXXI. The ring according to embodiment XXX, wherein the angle θ is in between 30° to 90°.

XXXII. The ring according to embodiment XXX or XXXI, wherein the angle θ is 80°.

XXXIII. The ring according to one or more of embodiments XVIII to XXXII, wherein a thickness is defined by the relative positioning of the first wall and the second wall.

XXXIV. The ring according to one or more of embodiments XVIII to XXXIII, wherein the stainless steel is a stainless-steel ring (52).

XXXV. The ring according to embodiment XXXIV, wherein the stainless-steel ring (52) has a thickness ranging between 1.0 mm to 3.0 mm.

XXXVI. The ring according to one or more of embodiments XVIII to XXV, wherein the thermoplastic polyurethane has the shore hardness ranging from Shore D hardness of 60 to Shore D hardness of 80 determined according to ASTM D2240-15e1.

The invention claimed is:

1. A dual-rate jounce bumper for limiting a jounce travel between a first component and a second component of a vehicle, with the second component spaced from and moveable towards the first component along a jounce axis, said dual-rate jounce bumper comprising:
a bumper having a first end for coupling to the first component and a second end spaced from said first end for contacting the second component, with said bumper compressible between the first component and the second component for limiting jounce, with said bumper radially expandable as said bumper is compressed, and
an outer member, disposed about said bumper and capable of limiting the radial expansion of said bumper as said bumper is compressed, for increasing a stiffness of the bumper,
wherein said outer member is obtained by overmolding stainless-steel with a thermoplastic polyurethane having a shore hardness ranging from a Shore D hardness of 50 to a Shore D hardness of 80, determined according to ASTM D2240-15e1,
wherein the thermoplastic polyurethane is obtained by reacting:
a polyol, an isocyanate, and optionally, a chain extender,
wherein the polyol comprises a polyether polyol,
wherein the polyether polyol has an average functionality in between 1.9 to 2.1 and a hydroxyl number in between 10 mg KOH/g to 500 mg KOH/g,
wherein the isocyanate comprises an aliphatic isocyanate or an aromatic isocyanate, and
wherein the aromatic isocyanate comprises methylene diphenyl diisocyanate and/or polymeric methylene diphenyl diisocyanate.

2. The dual-rate jounce bumper according to claim 1, wherein the outer member comprises an upper surface, a lower surface, a first wall and a second wall.

3. The dual-rate jounce bumper according to claim 2, wherein the upper surface, the first wall, the lower surface and the second wall are all connected to form a triangular cross section when viewed along a frontal plane.

4. The dual-rate jounce bumper according to claim 3, wherein the triangular cross section is defined by a first side, a second side and a third side, said first side and second side forming an angle θ therebetween.

5. The dual-rate jounce bumper according to claim 4, wherein the angle θ is in between 30° to 90°.

6. The dual-rate jounce bumper according to claim 2, wherein the upper surface and the lower surface are inclined towards each other.

7. The dual-rate jounce bumper according to claim 2, wherein each of the upper surface and the lower surface is an arcuate surface.

8. The dual-rate jounce bumper according to claim 1, wherein the isocyanate comprises an aromatic isocyanate.

9. The dual-rate jounce bumper according to claim 8, wherein the aromatic isocyanate comprises methylene diphenyl diisocyanate and/or polymeric methylene diphenyl diisocyanate.

10. The dual-rate jounce bumper according to claim 1, wherein the outer member has a hollow interior such that the bumper is disposed within said hollow interior.

11. The dual-rate jounce bumper according to claim 1, wherein the stainless-steel is a stainless-steel ring.

12. The dual-rate jounce bumper according to claim 1, wherein the chain extender, if present, comprises 1,4-butanediol.

13. The dual-rate jounce bumper according to claim 1, wherein the dual-rate jounce bumper is capable of bearing loads up to 150 kN.

14. A vehicle, comprising:
a frame member having the first component,
a suspension having the second component, and
the dual-rate jounce bumper according to claim 1.

15. A ring obtained by overmolding stainless-steel with a thermoplastic polyurethane having a shore hardness ranging from a Shore D hardness of 50 to a Shore D hardness of 80, determined according to ASTM D2240-15e1, said ring comprising:
an upper surface,
a lower surface,
a first wall, and
a second wall,
with said upper surface and said lower surface being inclined towards each other, wherein each of the upper surface and the lower surface is an arcuate surface, wherein the thermoplastic polyurethane is obtained by reacting:
a polyol, an isocyanate, and optionally, a chain extender,
  wherein the polyol comprises a polyether polyol,
  wherein the polyether polyol has an average functionality in between 1.9 to 2.1 and a hydroxyl number in between 10 mg KOH/g to 500 mg KOH/g,
  wherein the isocyanate comprises an aliphatic isocyanate or an aromatic isocyanate, and
  wherein the aromatic isocyanate comprises methylene diphenyl diisocyanate and/or polymeric methylene diphenyl diisocyanate.

16. The ring according to claim 15, wherein the upper surface, the first wall, the lower surface and the second wall are all connected to form a triangular cross section when viewed along a frontal plane.

17. The ring according to claim 16, wherein the triangular cross section is defined by a first side, a second side and a third side, said first side and second side forming an angle θ therebetween.

18. The ring according to claim 17, wherein the angle θ is in between 30° to 90°.

19. The ring according to claim 15, wherein the stainless-steel is a stainless-steel ring.

* * * * *